United States Patent
Buil et al.

(10) Patent No.: US 11,326,768 B2
(45) Date of Patent: May 10, 2022

(54) APPARATUS FOR PROVIDING SEMANTIC INFORMATION AND A METHOD OF OPERATING THE SAME

(71) Applicant: KONINKLIJKE PHILIPS N.V., Eindhoven (NL)

(72) Inventors: Vincentius Paulus Buil, Veldhoven (NL); Frederik Jan De Bruijn, Eindhoven (NL); Daniel Willem Elisabeth Schobben, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/315,839

(22) PCT Filed: Jul. 3, 2017

(86) PCT No.: PCT/EP2017/066431
§ 371 (c)(1),
(2) Date: Jan. 7, 2019

(87) PCT Pub. No.: WO2018/007285
PCT Pub. Date: Jan. 11, 2018

(65) Prior Publication Data
US 2020/0109845 A1   Apr. 9, 2020

(30) Foreign Application Priority Data
Jul. 8, 2016 (EP) ..................................... 16178600

(51) Int. Cl.
*F21V 23/04* (2006.01)
*A47G 1/02* (2006.01)
*F21W 131/302* (2006.01)

(52) U.S. Cl.
CPC ............ *F21V 23/0464* (2013.01); *A47G 1/02* (2013.01); *F21V 23/0478* (2013.01); *A47G 2200/08* (2013.01); *F21W 2131/302* (2013.01)

(58) Field of Classification Search
CPC ... A47G 1/02; F21V 23/0478; F21V 23/0471; F21W 2131/302
See application file for complete search history.

(56) References Cited

U.S. PATENT DOCUMENTS 8,288,964 B2 * 10/2012 Hente ..................... A45D 42/10
                                                      315/309
10,495,946 B2 * 12/2019 Shoemake ............. H04N 7/142
(Continued)

FOREIGN PATENT DOCUMENTS

JP    2002223910 A    8/2002
JP    2008018058 A    1/2008

OTHER PUBLICATIONS

Yoon et al: "Automatic Skin Pixel Selection and Skin Color Classification"; Copyright 2005, 2006 International Conference On Image Processing (ICIP-2006), pp. 1-4.
(Continued)

*Primary Examiner* — Matthew J. Peerce

(57) ABSTRACT

An apparatus including a display surface for presenting an image of a user; a light emitting portion for using light to convey semantic information to the user; a sensor for measuring the position of the user relative to the light emitting portion; and a control unit to control the light emitting portion based on the measured position of the user relative to the light emitting portion so as to minimize an effect of the light conveying the semantic information provided by the light emitting portion on the presented image of the user.

12 Claims, 6 Drawing Sheets

(56) References Cited

U.S. PATENT DOCUMENTS

| | | | | |
|---|---|---|---|---|
| 2011/0283577 | A1* | 11/2011 | Cornelissen | A47G 1/02 40/582 |
| 2013/0088154 | A1* | 4/2013 | Van Hoof | H05B 47/10 315/152 |
| 2015/0276187 | A1* | 10/2015 | Shoemake | G06F 1/1632 362/235 |
| 2016/0093081 | A1* | 3/2016 | Kim | G06F 3/167 345/156 |

OTHER PUBLICATIONS

Simple Human: Advertisement for Lighted Vanity Sensor Makeup Mirrors, Downloaded At www.simmplehuman.com/sensor-mirrors?gclid, Originally Downloaded Prior To Feb. 2016, 2 Pages.

Red Digital Cinema/Red 101, Advertisement for DSMC2 Cameras, Downloaded At www.red.com/learn/red-101/color-cast-tutorial, Copyright 2004-2019 Red.com, LLC, 2 Pages.

Barbie Digital Makeover—Smashing Ideas, Advertisement for Digital Makeover For iPad, downloaded at http://smashingideas.com/workbarbie-digital-makeover/; Originally Downloaded Before Feb. 2016, 8 Page Document.

Light Mirror On the App Store; Advertisement for a Lighted Mirror Application For iOS DEVICES, downloaded at http://itunes.apple.com/us/app/light-mirror/id396466213?mt=8, Originally Downloaded Beforej Feb. 2016, 2 Pages.

* cited by examiner

APPARATUS FOR PROVIDING SEMANTIC INFORMATION AND A METHOD OF OPERATING THE SAME

CROSS-REFERENCE TO PRIOR APPLICATIONS

This application is the U.S. National Phase application under 35 U.S.C. § 371 of International Application No. PCT/EP2017/066431, filed on Jul. 3, 2017 which claims the benefit of European Patent Application No. 16178600.9, filed on Jul. 8, 2016. These applications are hereby incorporated by reference herein.

FIELD OF THE INVENTION

The invention relates to an apparatus that comprises a display surface, such as a reflective surface/mirror or a display screen, and that can use light to provide semantic information to a user of the apparatus.

BACKGROUND OF THE INVENTION

During personal care activities a mirror is often used. Such mirrors should provide the user with good visibility of the face and/or body, e.g. to support the application of make-up to the face, carrying out skin care activities, grooming (e.g. shaving or hair trimming), oral care, applying or removing contact lenses, etc.

To improve the lighting conditions and thus improve the visibility of the user's face and/or body in the mirror, one or more light sources are often used to illuminate the user. These light source(s) can be integrated with the mirror (for example located in or on one or more edges of the mirror), or they can be separate from the mirror.

As an alternative to traditional mirrors that include a reflective surface, so-called 'virtual mirrors' or 'digital mirrors' have been developed that use one or more cameras or other image or video capture devices to capture images or video of the user and present them on a display screen in real-time (or near-real time). These virtual mirrors can also have an integrated or separate lighting system for improving the lighting conditions and thus improve the displayed image of the user.

SUMMARY OF THE INVENTION

To improve the performance of personal care activities, it has been suggested that mirrors (whether reflective surface-based or virtual) can be used to present information to the user about the personal care activity while the user is using the mirror. Similarly, while a user is using a mirror, the mirror can be used to present other relevant information to the user, for example the news headlines or a weather report.

For some semantic information (e.g. information relating to the performance of the personal care activities or other information that is useful to the user) it is possible to provide the information to the user using a display integrated into the mirror. However, this is not always desirable as the displayed information can interfere with (e.g. overlay) the reflected image of the user. Hence, using an integrated display inside the mirror is not always an ideal solution. Instead, it is proposed to present 'semantic information' to the user using a lighting system that is integrated or used with mirrors, or a separate lighting system that is provided in, on or with the mirror for the specific purpose of providing semantic information.

However, it is also desirable for the user to be evenly lit (either with the ambient light or by the integrated or separate lighting system) so that the user can optimally see their face and/or body in the mirror during a personal care activity, and using light to present semantic information to the user can affect the evenness of the lighting on the user (and thus on the image of the user presented by the mirror). For example, red light can be used to signify to the user that they have not brushed their teeth for a sufficient amount of time, but this will also cast red light onto the user's face and/or create shadows on the user's face, which will be visible to the user in the mirror.

Thus, there is a need for an improved apparatus and method of operating an apparatus that minimises the effect of light conveying semantic information on a presented image of a user.

According to a first aspect, there is provided an apparatus comprising a display surface for presenting an image of a user; a light emitting portion for using light to convey semantic information to the user; a sensor for measuring the position of the user relative to the light emitting portion; and a control unit configured to control the light emitting portion based on the measured position of the user relative to the light emitting portion so as to minimise the effect of the light conveying the semantic information provided by the light emitting portion on the presented image of the user.

In some embodiments, the display surface can present the image of the user in real-time. It will be appreciated that the real-time image may be a dynamic, moving image, otherwise referred to as a live image of the user.

In some embodiments the effect that is minimised is a shadowing and/or colour casting effect of the light conveying the semantic information provided by the light emitting portion on the user and the presented image of the user.

In some embodiments, the display surface is a mirror or other reflective surface. In other embodiments, the display surface is a display screen that displays images or video captured or obtained by one or more cameras or other image or video capture devices. In these embodiments, the apparatus can be a virtual mirror, a digital mirror or a smart mirror.

In some embodiments, the control unit is configured to control the light emitting portion by adjusting the brightness or intensity of the light used to convey the semantic information based on the measured position of the user relative to the light emitting portion. In some embodiments, the control unit is configured to control the brightness or intensity of the light emitting portion such that the brightness or intensity of the light conveying the semantic information is lower when the user is closer to the light emitting portion than when the user is further from the light emitting portion.

In some embodiments, the control unit is configured to control the light emitting portion by adjusting the colour, colour saturation and/or colour blend of the light used to provide the semantic information based on the measured position of the user relative to the light emitting portion.

In some embodiments, the light emitting portion comprises a plurality of light emitting elements that can be used to convey the semantic information, and the control unit is configured to control the number of light emitting elements used to convey the semantic information based on the measured position of the user relative to the light emitting portion. The control unit can be configured to control the number of light emitting elements used to convey the semantic information such that the number of light emitting elements used to convey the semantic information is lower when the user is closer to the light emitting portion than when the user is further from the light emitting portion.

In some embodiments, the light emitting portion comprises a plurality of light emitting elements that can be used to convey the semantic information, and the control unit is configured to control a light emission angle or focus of the light emitted by the light emitting elements based on the measured position of the user relative to the light emitting portion.

In some embodiments, the sensor comprises a distance sensor, a proximity sensor, a camera or image sensor.

In some embodiments, the apparatus further comprises a sensor for obtaining one or more images or a video sequence of a user of the apparatus; wherein the control unit is further configured to analyse the obtained one or more images or video sequence to determine an effect of the light conveying the semantic information on the user and/or to determine the evenness of lighting on the user; and control the light emitting portion based on the measured position of the user relative to the light emitting portion and the determined effect of the light and/or determined evenness of the lighting so as to minimise the effect of the light conveying the semantic information provided by the light emitting portion on the presented image of the user. This embodiment has an advantage that it can adjust the light emitting portion to take into account the actual effect of the light conveying the semantic information on the user.

In some embodiments, the apparatus further comprises a sensor for detecting an ambient light level or contribution of ambient light; and the control unit is configured to control the light emitting portion so as to minimise the effect of the semantic information provided by the light emitting portion on the presented image of the user based on the ambient light and the measured position of the user relative to the light emitting portion. In these embodiments, the sensor for detecting an ambient light level or contribution of ambient light can be a light sensor, a camera or an image sensor. This embodiment has an advantage that the ambient light level is taken into account when adjusting the light emitting portion in order to effect an appropriate level of adjustment to the light conveying the semantic information.

In some embodiments, the display surface is a reflective surface, e.g. as in a conventional mirror. In other embodiments, the display surface is a display screen that displays an image or video sequence obtained using a camera or an image sensor, i.e. a virtual mirror.

According to a second aspect, there is provided a method of operating an apparatus to convey semantic information to a user of the apparatus, the apparatus comprising a display surface for displaying an image of the user, the method comprising measuring the position of a user relative to a light emitting portion of the apparatus; and controlling the light emitting portion to emit light to convey the semantic information to the user, wherein the light emitting portion is controlled based on the measured position so as to minimise the effect of the light conveying the semantic information on an image of the user presented on the display surface.

In some embodiments, the display surface can present the image of the user in real-time. It will be appreciated that the real-time image may be a dynamic, moving image, otherwise referred to as a live image of the user.

In some embodiments the effect that is minimised is a shadowing and/or colour casting effect of the light conveying the semantic information provided by the light emitting portion on the user and the presented image of the user.

In some embodiments, the display surface is a mirror or other reflective surface. In other embodiments, the display surface is a display screen that displays images or video captured or obtained by one or more cameras or other image or video capture devices. In these embodiments, the apparatus can be a virtual mirror, a digital mirror or a smart mirror.

In some embodiments, the step of controlling comprises controlling the light emitting portion by adjusting the brightness or intensity of the light used to convey the semantic information based on the measured position of the user relative to the light emitting portion. In some embodiments, the step of controlling comprises controlling the brightness or intensity of the light emitting portion such that the brightness or intensity of the light conveying the semantic information is lower when the user is closer to the light emitting portion than when the user is further from the light emitting portion.

In some embodiments, the step of controlling comprises controlling the light emitting portion by adjusting the colour, colour saturation and/or colour blend of the light used to provide the semantic information based on the measured position of the user relative to the light emitting portion.

In some embodiments, the light emitting portion comprises a plurality of light emitting elements that can be used to convey the semantic information, and the step of controlling comprises controlling the number of light emitting elements used to convey the semantic information based on the measured position of the user relative to the light emitting portion. The step of controlling can comprise controlling the number of light emitting elements used to convey the semantic information such that the number of light emitting elements used to convey the semantic information is lower when the user is closer to the light emitting portion than when the user is further from the light emitting portion.

In some embodiments, the light emitting portion comprises a plurality of light emitting elements that can be used to convey the semantic information, and the step of controlling comprises controlling a light emission angle or focus of the light emitted by the light emitting elements based on the measured position of the user relative to the light emitting portion.

In some embodiments, the step of measuring the position of the user relative to the light emitting portion of the apparatus comprises measuring the position using a distance sensor, a proximity sensor, a camera or image sensor.

In some embodiments, the method further comprises the steps of obtaining one or more images or a video sequence of a user of the apparatus; analysing the obtained one or more images or video sequence to determine an effect of the light conveying the semantic information on the user and/or to determine the evenness of lighting on the user; and the step of controlling comprises controlling the light emitting portion based on the measured position of the user relative to the light emitting portion and the determined effect of the light and/or determined evenness of the lighting so as to minimise the effect of the light conveying the semantic information provided by the light emitting portion on the presented image of the user. This embodiment has an advantage that it can adjust the light emitting portion to take into account the actual effect of the light conveying the semantic information on the user.

In some embodiments, the method further comprises the step of detecting an ambient light level or contribution of ambient light; and the step of controlling comprises controlling the light emitting portion so as to minimise the effect of the semantic information provided by the light emitting portion on the presented image of the user based on the ambient light and the measured position of the user relative to the light emitting portion. In these embodiments, the sensor for detecting an ambient light level or contribution of ambient light can be a light sensor, a camera or an image sensor. This embodiment has an advantage that the ambient light level is taken into account when adjusting the light emitting portion in order to effect an appropriate level of adjustment to the light conveying the semantic information.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
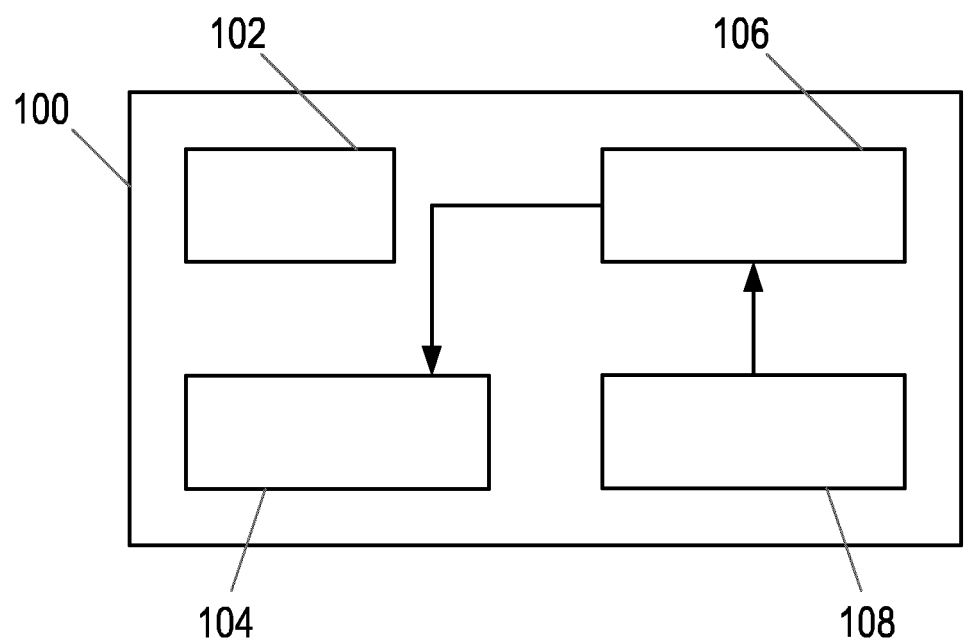
FIG. 1 is a block diagram of an apparatus according to an embodiment of the invention.

FIG. 1 shows an example of an apparatus 100 according to an embodiment of the invention. The apparatus 100 is generally for allowing a user to view themselves and for providing semantic information to the user. Thus, the apparatus 100 comprises a display surface 102 that is for presenting an image of a user (i.e. the user's reflection) to the user of the apparatus 100. In some embodiments, the display surface 102 is a reflective (i.e. mirrored) surface such as that found in a conventional mirror, and thus the display surface 102 simply presents a reflection of the surroundings, including the user when the apparatus 100 is in use. Alternatively, the apparatus 100 can be a so-called 'virtual mirror', 'smart mirror' or 'digital mirror' and thus the display surface 102 can be a display screen that displays an image or video sequence obtained by a camera, image sensor or video sensor associated with the apparatus 100. This camera, image sensor or video sensor is not shown in FIG. 1. The camera, image sensor or video sensor can be arranged or oriented with respect to the display surface 102 such that when a user is in front of the display surface 102, the display surface 102 shows the captured image or video sequence of the user. It will be appreciated that the captured image or video sequence can be reflected around a vertical axis in order for the image or video sequence displayed on the display screen to represent the user's 'reflection'.

In the case where the display surface 102 is a display screen that displays images or video of the user, it will be appreciated that the display surface 102 preferably presents a real-time or live image or video sequence of the user. Thus the image or video is presented on the display screen 102 as quickly as possible after capture by the camera, image sensor or video sensor in order for the apparatus 100 to operate as close to a conventional reflective surface mirror as possible. Of course, it will be appreciated that there will inevitably be a small delay between capture of the images or video and display on the display screen (e.g. due to image or video processing by the camera, image sensor or video sensor and the display screen), but this will be sufficiently short that the images or video presented on the display screen appear to be in real-time or live from the perspective of the user (and thus the displayed images or video will appear to the user to be a reflection of the user).

Semantic information is provided to the user using a light emitting portion 104. In particular, the light emitting portion 104 is for emitting light in certain configurations, patterns, colours, etc. in order to convey information to the user. The light emitting portion 104 may be configured or controllable to provide or display words, numerals, symbols, images and/or patterns that are each associated with certain semantic information. The semantic information can be information relating to the performance of a personal care activity by the user or other information that is useful to the user.

The light emitting portion 104 typically comprises a plurality of light emitting elements. The light emitting elements can be light emitting diodes, LEDs, organic LEDs, OLEDs, filament-based bulbs, compact fluorescent lamps, CFLs, halogen bulbs, etc. The light emitting elements can be of different sizes, shapes and/or colours (or have a controllable colour) and each light emitting element can be controlled individually or in combination with one or more other light emitting elements. One or more, or all, of the light emitting elements can be controlled at any given time to provide semantic information to the user.

A control unit 106 is provided that can control the operation of the light emitting portion 104. In particular, the control unit 106 can control the light emitting portion 104 to provide semantic information to the user, as required. Where the light emitting portion 104 comprises a plurality of light emitting elements, the control unit 106 can control the light emitting elements, individually and/or in combination in order to provide the semantic information. It will be appreciated that the control unit 106 can determine the semantic information to be provided to the user using the light emitting portion 104, for example by monitoring the user using one or more sensors or personal care devices, and/or by obtaining information to be presented to the user (e.g. news headlines or a weather report) from an external information source (e.g. the internet).

The control unit 106 can be implemented in numerous ways, with software and/or hardware, to perform the required function(s). The control unit 106 may comprise one or more microprocessors that may be programmed using software to perform the required functions. The control unit 106 may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In some embodiments, in order for the face and/or body of the user to be well-lit when using the apparatus 100 (i.e. to make it easier for the user to see themselves in the display surface 102), the apparatus 100 can further comprise another light source (not shown in FIG. 1) that is provided for the purpose of evenly lighting the user while they are using the apparatus 100. As with the light emitting portion 104 above, this light source can comprise one or more LEDs, OLEDs, filament-based bulbs, CFLs, halogen bulbs, etc.

Alternatively, where only part of the light emitting portion 104 is being used to provide semantic information to the user at any given time, the other part of the light emitting portion 104 can be used to illuminate the user of the apparatus 100. This avoids the need for a separate light source to be provided for illuminating the user.

In some embodiments, the light emitting portion 104 (and thus the light emitting elements) is arranged next to, in, on, or partly or completely surrounding the display surface 102. Thus, for example, the light emitting portion 104 can form a border for the display surface 102, although those skilled in the art will be aware of other ways in which the light emitting portion 104 and the display surface 102 can be arranged. For example, the light emitting portion 104 can be arranged along one or more sides of the display surface 104, or arranged to primarily illuminate a wall or other surface behind the display surface 102 so that the user can perceive the semantic information from the light illuminating the wall or other surface.

In some examples, the semantic information provided by the light emitting portion can relate to time, for example a counter, timer or a progress bar relating to the time remaining on a counter for a personal care activity, such as brushing teeth. Another example of semantic information relating to a personal care activity can be an indication of which area(s) of the face have/have not been cleaned or shaved, or which quadrants of the mouth have/have not been brushed when brushing teeth. A further example of semantic information can include an indication of whether the pressure applied by the user in brushing their teeth or exfoliating their skin is sufficient (or excessive). A further example of semantic information is an indication of whether the position or orientation of a personal care device (e.g. a toothbrush, shaver, hair trimmer, etc.) is correct. Yet another example of semantic information that may be displayed by the light emitting portion 104 includes health information such as body weight, body weight trends. Those skilled in the art will be aware of many other types of semantic information that could be presented to a user using light from a light emitting portion 104.

Figure 2:
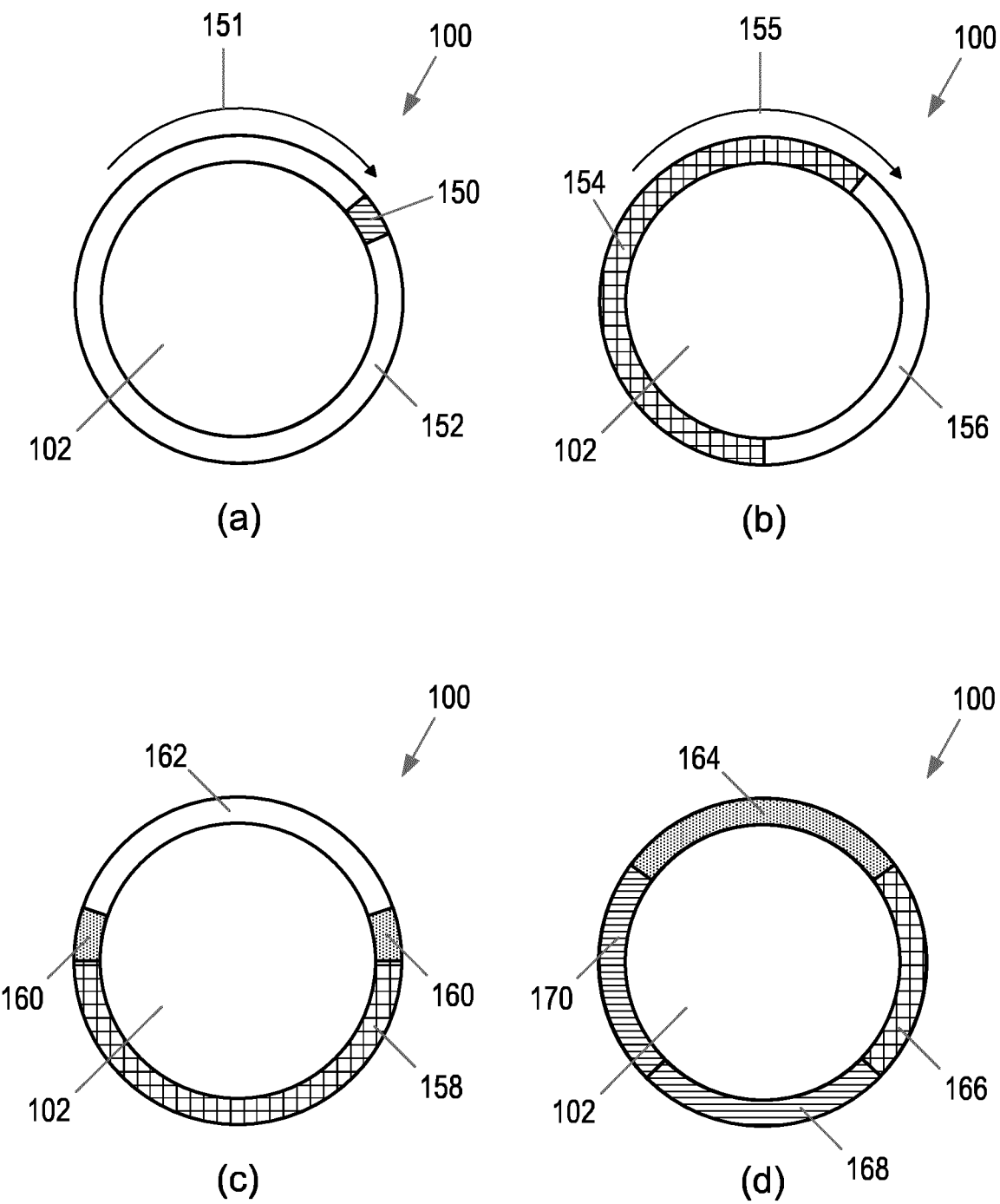
FIG. 2 illustrates examples of providing semantic information using light.

FIG. 2 illustrates four examples of how semantic information can be indicated to a user using light. In FIG. 2, the apparatus 100 is shown with a circular display surface 102 where the light emitting portion 104 extends around the complete periphery of the display surface. It will be appreciated that the display surface 102 can have a different shape to that shown, and/or the light emitting portion 104 can be arranged differently (e.g. just on part of the sides, or within the periphery of the display surface 102).

Thus, in FIG. 2a, the semantic information is provided by emitting light from a small segment 150 of the light emitting portion 104, and moving the segment 150 around the display surface 104 over time, as indicated by the arrow 151. This can be used, for example, to indicate a time elapsed or time remaining for a personal care activity. It will be appreciated that the light emitting portion 104 itself does not move, and thus the 'movement' of the segment 150 is achieved by selectively illuminating different (e.g. successive) parts of the light emitting portion 104 over time. The segment 150 may be provided by one or more of the light emitting elements in the light emitting portion 104. In some embodiments the other part 152 of the light emitting portion 104 (i.e. the parts other than segment 150), can be switched off while segment 150 is lit, but in other embodiments part 152 can be continuously lit, and/or lit in a different colour or intensity to the segment 150 in order to illuminate the user.

The illumination shown in FIG. 2b can be used to illustrate time elapsed. In this example, a progress/timer bar segment 154 is gradually increased in size as time elapses. Thus, as time elapses, more parts of the light emitting portion 104 are lit to form the progress/timer bar 154, as indicated by arrow 155. As with the example in FIG. 2a, the remaining segment 156 of the light emitting portion 104 can be switched off until required, or it can be continuously lit and/or lit in a different colour or intensity to the bar 154 in order to illuminate the user.

In FIG. 2c, the semantic information is in the form of a trend/status indicator 158, 160, where status/trend against a target is indicated by how much of the trend/status bar 158, 160 is lit. This can be used, for example, to show whether the user is applying the correct pressure with a toothbrush, where the correct amount of pressure corresponds to bar 158 being completely lit, and where an excess amount of pressure corresponds to bar 160 being lit as well (for example in red to indicate that the user is pressing too hard). As with the examples in FIGS. 2a and 2b, the remaining segment(s) 162 of the light emitting portion 104 can be switched off, or they can be continuously lit and/or lit in a different colour or intensity to the bar 158, 160 in order to illuminate the user.

FIG. 2d shows a form of illumination that can be used to represent whether a user has brushed the teeth in each quadrant of their mouth correctly. Thus, the light emitting portion 104 is divided into four segments 164, 166, 168, 170, that each represent a respective quadrant of the mouth. In this example, the colour of each segment 164, 166, 168, 170 is used to indicate whether the corresponding quadrant has been brushed correctly. Thus, segment 168 and 170 could be green to indicate that those quadrants have been brushed correctly, segment 166 could be yellow to indicate that that quadrant has only been partially brushed, and segment 164 can be red to indicate that that quadrant has not been brushed at all. The colour of each segment can be controlled and updated as the user brushes their teeth.

As noted above, a problem exists in that it is desirable for a user to be evenly lit (either with the ambient light or by the light emitting portion 104 or separate light source) so that the user can optimally see their face and/or body in the display surface 102, but using light to present semantic information to the user can affect the evenness of the lighting on the user (and thus on the image of the user presented by the display surface). For example, providing semantic information by emitting light (particularly non-white light) can cause shadowing or colour-casting on the user.

It has been recognised that the effect of the light used to convey the semantic information depends on how close the user is to the light emitting portion 104 (for example shadowing and/or colour-casting on the user are more pronounced when the user is closer to the light emitting portion 104 than further away), and therefore it has been found that the characteristics of the light used to convey the semantic information can be adjusted to minimise the effect of the shadowing or colour-casting. Thus, in accordance with the invention, the apparatus 100 is provided with a sensor 108 for measuring the position of the user relative to the light emitting portion 104, and the control unit 106 is configured to control the light emitting portion 104 based on the measured position of the user relative to the light emitting portion 104 so as to minimise the effect of the light used to convey the semantic information provided by the light emitting portion 104 on the presented image of the user.

The sensor 108 is configured to measure the position of the user relative to the light emitting portion 104. In some embodiments, the sensor 108 is a distance sensor that directly measures the distance from the light emitting portion 104 to the user (or more generally from the sensor 108 in the apparatus 100 to the user). The sensor 108 can output a signal representing the measured distance to the control unit 106, or output a signal to the control unit 106 that can be processed or analysed by the control unit 106 to determine the distance. The sensor 108 can be any suitable type of distance sensor, for example an IR proximity sensor, ultrasonic distance sensor or a camera or other image sensor (whose images can be processed, for example by control unit 106, to determine the distance to a user in the image, or to determine a distance associated with a certain autofocus level). Where the apparatus 100 is a virtual mirror or digital mirror, the images or video sequences captured using the camera or other type of image sensor present in that apparatus 100 can be analysed to determine the position of the user relative to the light emitting portion 104, and thus a separate sensor 108 is not required.

In some embodiments, the sensor 108 may indirectly measure the distance from the light emitting portion 104 to the user by determining when a user is within a threshold distance of the light emitting portion 104 (or more generally within a threshold distance of the apparatus 100). In these embodiments the sensor 108 can be a proximity sensor (for example an infrared (IR) proximity sensor), and the sensor 108 can output a signal indicating whether or not the user is within the threshold distance.

As noted above, the control unit 106 is configured to control the light emitting portion 104 based on the measured position of the user relative to the light emitting portion 104. In particular, the control unit 106 can control the brightness or intensity of the light that provides the semantic information; the colour, colour saturation, colour balance or blend of colours of the light that provides the semantic information; the number of light emitting elements used to provide the light for the semantic information; the focus or light emission angle from the light emitting elements used to provide the semantic information; or any combination thereof.

Thus, the control unit 106 can reduce the brightness or intensity of the light that conveys the semantic information when the user is close to the light emitting portion 104 compared to when the user is further away from the light emitting portion 104.

In addition or alternatively, the control unit 106 can change the colour, colour saturation, colour balance or blend of colours of the light that conveys the semantic information when the user is close to the light emitting portion 104 so that the light does not cause (or causes negligible) colour casting on the user compared to the colour, colour saturation, colour balance or blend of colours of the light that is used when the user is further away from the light emitting portion 104 and colour-casting is less likely to occur. For example, when the user is close to the light emitting portion 104, the control unit 106 can control the colour, colour saturation, colour balance or blend of colours of the light that conveys the semantic information so that the light is mixed to a neutral white or grey tone at the point where it meets the user's face, or is desaturated to such a level that the effect of the colour-casting is negligible to the user.

In addition or alternatively, the control unit 106 can reduce the number of light emitting elements used to provide the light that conveys the semantic information when the user is close to the light emitting portion 104 compared to when the user is further away from the light emitting portion 104. The use of fewer light emitting elements reduces the total light output by the light emitting portion 104, and thus reduces the amount of additional illumination of the user provided by the semantic information.

In addition or alternatively, the control unit 106 can change the focus or light emission angle from the light emitting elements used to provide the semantic information (particularly where the light emitting elements emit a mixture of colours) such that the light is mixed at a shorter distance from (i.e. closer to) the light emitting portion 104 when the user is close to the light emitting portion 104 compared to when the user is further away from the light emitting portion 104.

It will be appreciated that in some embodiments the parameters of the light emitting portion 104 can be controlled continuously or semi-continuously based on the measured position or distance (i.e. the parameters are dynamically changing with the measured position or distance). In other embodiments the parameters of the light emitting portion 104 can be changed in a step-wise manner based on the measured position or distance. In further embodiments, the parameters of the light emitting portion 104 can have two settings, one setting based on the user being close to the light emitting portion 104 (e.g. when the user is within a threshold distance of the light emitting portion 104) and the other setting based on the user being sufficiently far from the light emitting portion 104 (e.g. when the user is more than the threshold distance from the light emitting portion 104).

Controlling the light emitting portion 104 as outlined above based on the measured position of the user reduces the shadowing or colour-casting effect from the light conveying the semantic information on the user when the user is close to the apparatus 100. Although in some embodiments this effect is achieved at the expense of the brightness or saturation of the light that conveys the semantic information, when the user is not close to the light emitting portion 104 brighter and/or more saturated light can still be used to provide the semantic information.

Figure 3:
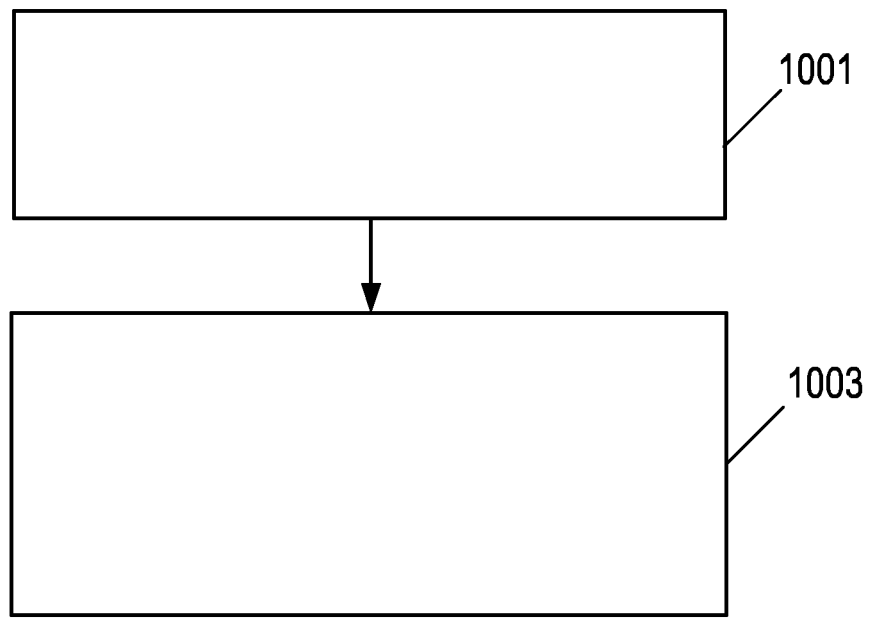
FIG. 3 is a flow chart illustrating a method of operating an apparatus according to an embodiment of the invention.

The flow chart in FIG. 3 illustrates a method of operating the apparatus 100 according to the invention. In step 1001, the position of a user relative to a light emitting portion 104 of the apparatus 100 is measured. As noted above, the position can be measured using a sensor 108 in the apparatus 100. In some embodiments, the position is measured in terms of the distance of the user from the light emitting portion 104 or apparatus 100, or in terms of whether the user is within a threshold distance of the light emitting portion 104.

When the apparatus 100 is to provide semantic information to the user using light from a light emitting portion 104 of the apparatus 100, the control unit 106 controls the light emitting portion 104 to provide the semantic information, and in particular controls the light emitting portion 104 based on the measured position, so as to minimise the effect (e.g. colour-casting and/or shadowing) of the light conveying the semantic information on the presented image of the user (step 1003).

Thus, in step 1003, the control unit 106 controls the light emitting portion 104 based on the measured position of the user relative to the light emitting portion 104 to control the brightness or intensity of the light that provides the semantic information; the colour, colour saturation, colour balance or blend of colours of the light that provides the semantic information; the number of light emitting elements used to provide the light for the semantic information; and/or the focus or light emission angle from the light emitting elements used to provide the semantic information.

Figure 4:
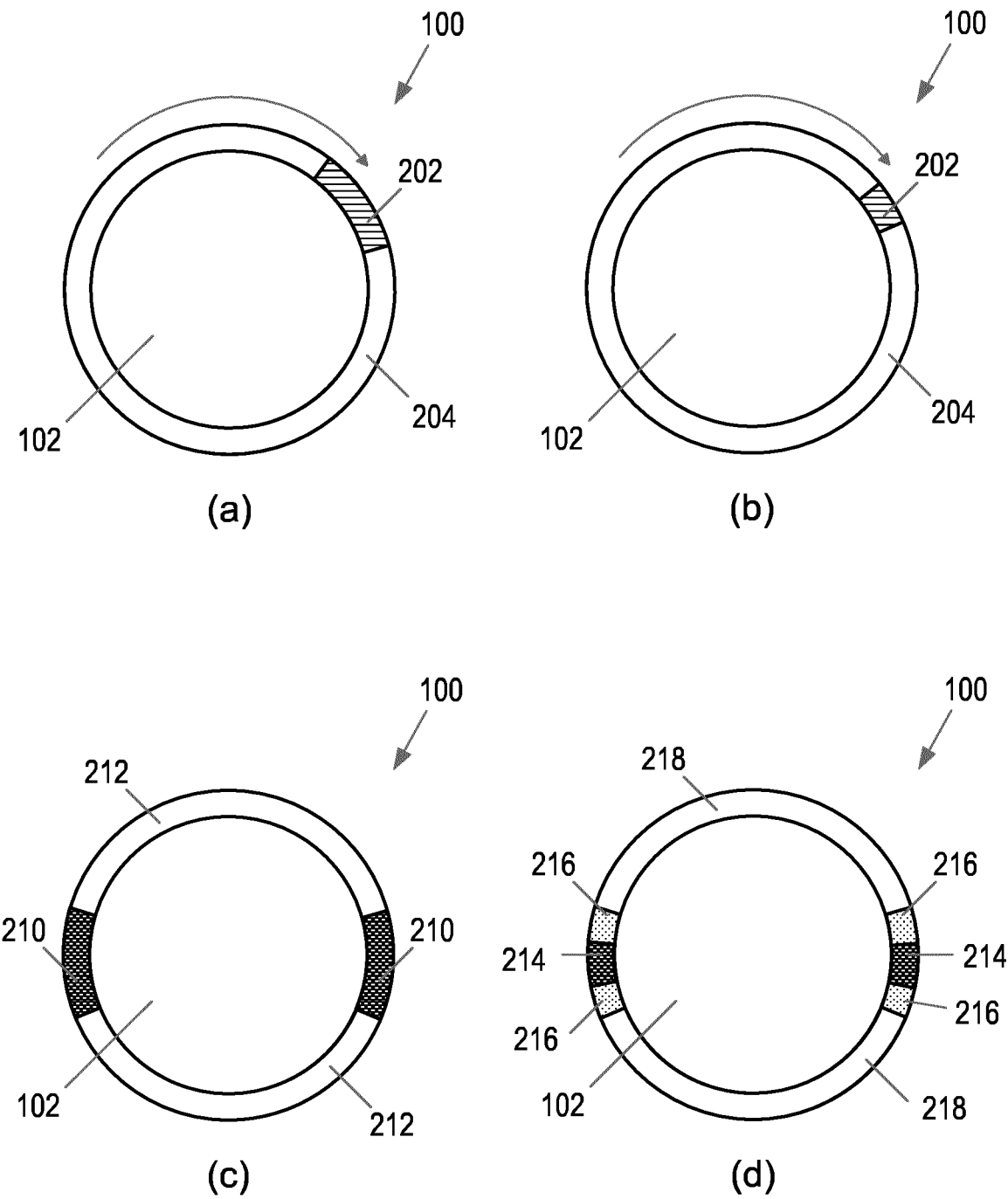
FIG. 4 illustrates examples of controlling a light emitting portion according to embodiments of the invention.
Figure 4:
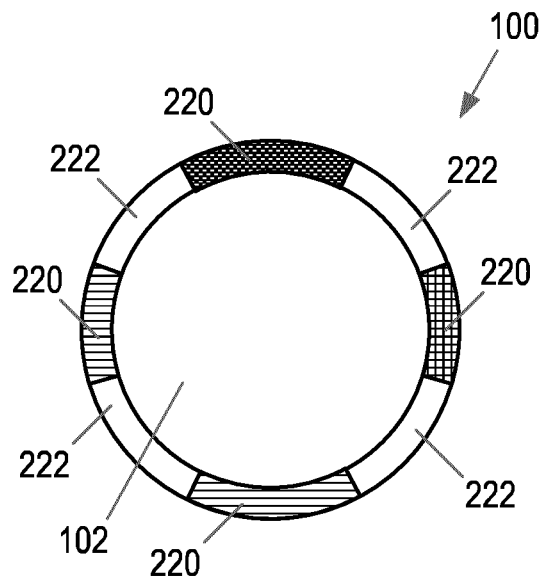
Figure 4:
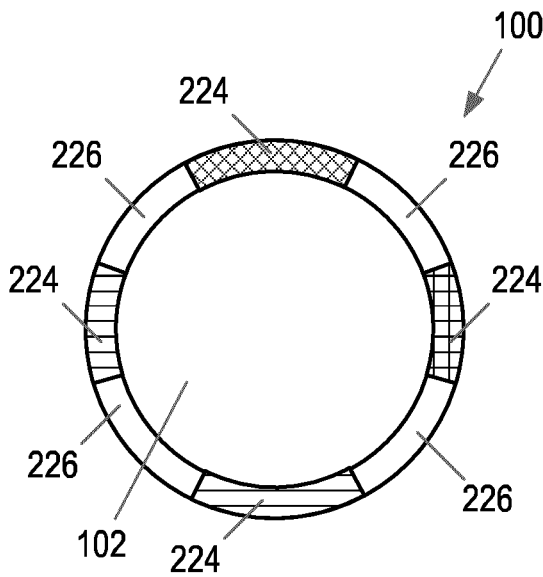
Figure 4:
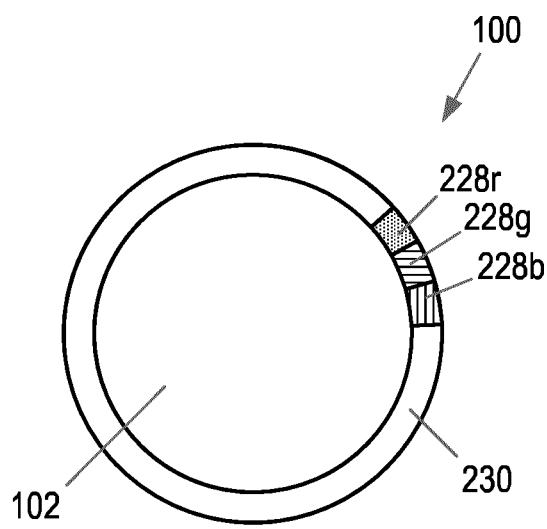
Figure 4:
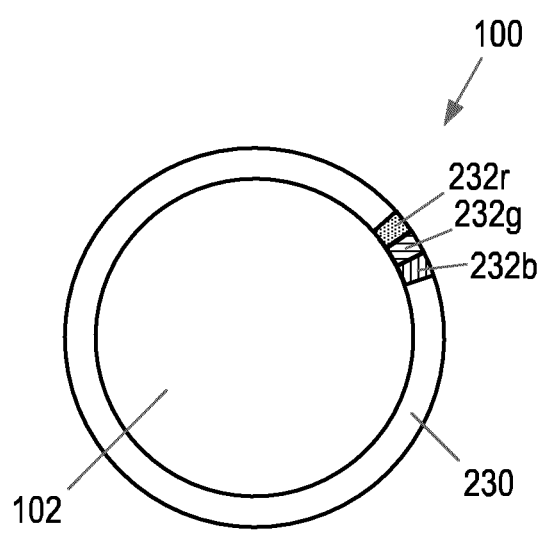

FIG. 4 illustrates various examples of how the light emitting portion 104 can be controlled according to embodiments of the invention. The apparatus 100 illustrated in FIG. 4 is similar to the apparatus 100 shown in FIG. 2, and thus comprises a circular display surface 102 where the light emitting portion 104 extends around the complete periphery of the display surface 102. As with FIG. 2, it will be appreciated that the display surface 102 can have a different shape to that shown, and/or the light emitting portion 104 can be arranged differently (e.g. just on part of the sides, or within the periphery of the display surface 102).

FIGS. 4a and 4b show a first example of how the light emitting portion 104 can be controlled to minimise the effect of the light conveying the semantic information on the user. The semantic information in FIGS. 4a and 4b, or rather the manner of indicating the semantic information, is similar to that shown in FIG. 2a and thus comprises a segment 202 that is moved around the periphery of the display surface 102 to indicate, for example, a time elapsed or time remaining for a personal care activity. The remaining segment 204 of the light emitting portion 104 is not used to convey the semantic information (for example the remaining segment 204 does not emit light at all or is used to generally illuminate the user). The segment 202 is formed from a plurality of light emitting elements.

When the user is close to the light emitting portion 104, the light from segment 202 can cause shadowing or colour-casting on the user's face, and this can be visible to the user in the image presented on the display surface 104. Thus, when it is determined that the user is not close to the light emitting portion 104 (e.g. the measured position indicates that the user is more than a threshold distance from the light emitting portion 104), the segment 202 can be as shown in FIG. 4a. However, if the user is close to the light emitting portion 104 (e.g. the measured position indicates that the user is less than a threshold distance from the light emitting portion 104), the size of the segment 202 can be reduced (for example by representing the segment 202 with less light emitting elements than in FIG. 4a), as shown in FIG. 4b.

It will be appreciated that the change in the number of light emitting elements forming the segment 202 is not restricted to the moving segment 202 type of semantic information shown in FIGS. 4a and 4b, and it can be applied to any way in which semantic information is conveyed to the user.

FIGS. 4c and 4d show a second example of how the light emitting portion 104 can be controlled to minimise the effect of the light conveying the semantic information on the user. The semantic information in FIG. 4c comprises two segments 210 that are positioned on opposite sides of the display surface 102 (although it will be appreciated that the illustrated positions of the segments 210 are not limiting). The remaining segments 212 of the light emitting portion 104 are not used to convey the semantic information (for example the remaining segments 212 do not emit light at all or are used to generally illuminate the user). The segment 210 can be formed from one or more light emitting elements. In FIG. 4c the user is not close to the light emitting portion 104, and so the segments 210 convey the semantic information using light with a desired colour saturation, colour or colour blend.

When the user is close to the light emitting portion 104, the light from segment 210 can cause shadowing or colour-casting on the user's face, and this can be visible to the user in the image presented on the display surface 104. Thus, when it is determined that the user is close to the light emitting portion 104 (e.g. the measured position indicates that the user is less than a threshold distance from the light emitting portion 104), the control unit 106 can control the light emitting portion 104 so that the colour saturation, colour or colour blend of the light forming the segments 210 causes less shadowing or colour-casting on the user. Thus, as shown in FIG. 4d, the light emitting portion 104 can be controlled so that the semantic information is conveyed using a segment 214 (that is smaller than segment 210 in FIG. 4c) with light of the same colour saturation, colour or colour blend as segment 210 in FIG. 4c, and two other small segments 216 are provided either side of segment 214 that have a different colour saturation, colour or colour blend to segment 214, so that the combined effect of segments 214 and 216 is that the shadowing or colour-casting on the user is reduced compared to that from segment 210 in FIG. 4c.

For example the segments 210 can be a bright red colour, and when the user is closer to the light emitting portion 104, the size of the light emitting portion that is a bright red colour (segment 214) can be reduced, and neighbouring segments 216 with a less saturated colour (e.g. light pink) can be used to reduce the colour-casting or shadowing on the user.

It will be appreciated that the change in the colour saturation, colour or colour blend of the segment 210 is not restricted to the type of semantic information shown in FIGS. 4c and 4d, and it can be applied to any way in which semantic information is conveyed to the user.

FIGS. 4e and 4f show a third example of how the light emitting portion 104 can be controlled to minimise the effect of the light conveying the semantic information on the user. The semantic information in FIGS. 4e and 4f comprises four segments that are individually controllable to convey semantic information to the user. The type of semantic information provided in FIGS. 4e and 4f can be as shown in FIG. 2d, e.g. with each segment representing whether a quadrant in the user's mouth has been brushed correctly.

Thus, in FIG. 4e, four segments 220 are provided that each display a particular colour at a particular brightness or intensity level. The remaining segments 222 of the light emitting portion 104 are not used to convey the semantic information (for example the remaining segments 222 do not emit light at all or are used to generally illuminate the user). Each segment 220 can be formed from one or more light emitting elements. In FIG. 4e the user is not close to the light emitting portion 104, and so the segments 220 convey the semantic information using light with a desired brightness or intensity.

When the user is close to the light emitting portion 104, the light from segments 220 can cause shadowing or colour-casting on the user's face, and this can be visible to the user in the image presented on the display surface 104. Thus, when it is determined that the user is close to the light emitting portion 104 (e.g. the measured position indicates that the user is less than a threshold distance from the light emitting portion 104), the control unit 106 can control the light emitting portion 104 so that the brightness or intensity of the light forming the segments 220 causes less shadowing or colour-casting on the user. Thus, as shown in FIG. 4f, the light emitting portion 104 can be controlled so that the semantic information is conveyed using segments 224 with light of a lower brightness intensity or colour saturation than used in segment 220 in FIG. 4e (segments 226 are not used to convey semantic information, similar to segments 222 in FIG. 4e). Thus, the lower brightness and/or intensity of the segments 224 in FIG. 4f will reduce the shadowing or colour-casting on the user compared to that from segments 220 in FIG. 4e.

It will be appreciated that the change in the brightness intensity or colour saturation of the segments 220 is not restricted to the type of semantic information shown in FIGS. 4e and 4f, and it can be applied to any way in which semantic information is conveyed to the user.

FIGS. 4g and 4h show a fourth example of how the light emitting portion 104 can be controlled to minimise the effect of the light conveying the semantic information on the user. The semantic information in FIGS. 4g and 4h is similar to that shown in FIGS. 4a and 4b and thus comprises a segment 228 that moves around the light emitting portion 104. In this example, the remaining segment 230 of the light emitting portion 104 is not used to convey the semantic information, but is used to generally illuminate the user.

In this example, the moving segment 228 is formed of a red segment 228r, a green segment 228g and a blue segment 228b which on average produce light that has the same colour (i.e. white) and intensity as the remaining segment 230. However, when the user moves closer to the light emitting portion 104, the user can perceive the red, green and blue segments rather than the 'averaged' white light that is intended (and thus red, green and blue light can be cast onto the user), and so when the user is close to the light emitting portion 104 (e.g. the measured position indicates that the user is less than a threshold distance from the light emitting portion 104), the size of the red, green and blue segments 228 can be reduced as shown by segments 232r, 232g and 232b in FIG. 4h. This change in the size of the segments 232 means that the red, green and blue segments can still create the desired light mix for the closer distance, and so the user will still perceive the 'averaged' colour (e.g. white) as intended (and generally at the intended size), and red, green and blue colour casting on the user will be reduced.

Figure 5:
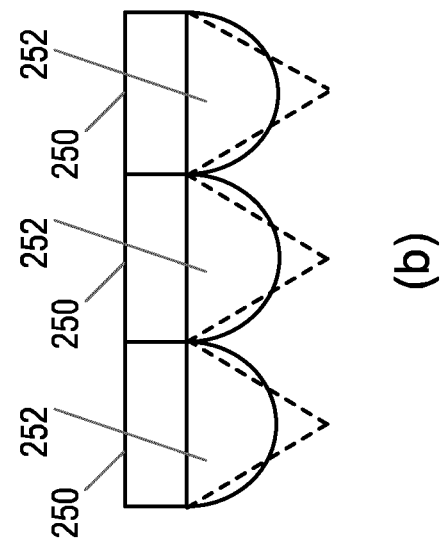
FIG. 5 illustrates an alternative example of controlling a light emitting portion according to an embodiment of the invention.
Figure 5:
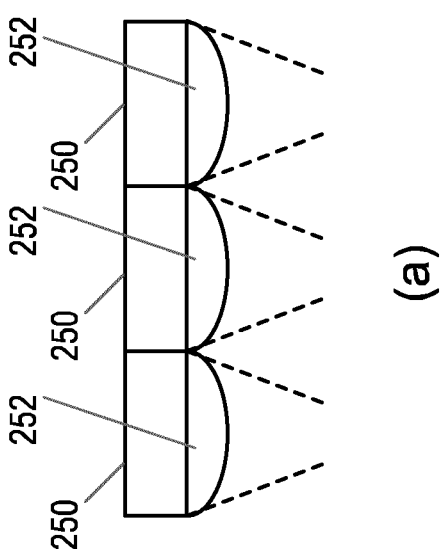

As noted above, in some embodiments, the control unit 106 can change the focus or light emission angle from the light emitting elements used to provide the semantic information (particularly where the light emitting elements emit a mixture of colours) such that the light is mixed at a shorter distance from (i.e. closer to) the light emitting portion 104 when the user is close to the light emitting portion 104 compared to when the user is further away from the light emitting portion 104. This is illustrated in FIG. 5. FIGS. 5a and 5b show three light emitting elements 250 that each have an adjustable optical arrangement 252 (e.g. an adjustable lens or lens arrangement) that can change the focus of the light emitted by each light emitting element 250 or that can change the emission angle of the light from each light emitting element 250. Adjusting the optical arrangement 252 can change the distance from the light emitting portion 104 at which light from each light emitting element 250 is mixed. For example, as shown in FIG. 5a, when the user is not close to the light emitting portion 104 (e.g. the measured position indicates that the user is more than a threshold distance from the light emitting portion 104), the optical arrangements 252 can be adjusted by the control unit 106 such that the light is mixed further from the light emitting portion 104 (i.e. the emission angle is narrower) than when the user is close to the light emitting portion 104 (as shown in FIG. 5b), i.e. where the focus is closer to the light emitting portion 104 (i.e. the emission angle is wider).

In some embodiments, the control of the light emitting portion 104 based on the measured position described above can be predetermined and the required control programmed into the control unit 106 (i.e. for a particular measured position the light emitting portion 104 is to be controlled in a certain way). However, in other embodiments, the control unit 106 can predict a colour casting or shadowing effect of the light used to convey the semantic information, and use this prediction with the measured position to determine how to control the light emitting portion 104. For example, in some embodiments the apparatus 100 can comprise a sensor for detecting an ambient light level or contribution of ambient light (for example a light sensor or a camera or image sensor), and the control unit 106 can control the light emitting portion 104 based on the measured position and the measured ambient light level or detected ambient light contribution. For example, light used to provide semantic information to the user is more likely to cause shadowing or colour casting when the ambient light level is low than when the ambient light level is normal or higher. Likewise, light used to provide semantic information to the user is more likely to cause shadowing or colour casting on parts of the user where the contribution to the lighting of the user due to ambient lighting is low. Thus, if it is determined that the ambient light level or ambient light contribution is low, then the control unit 106 may make a larger adjustment to the parameter(s) of the light emitting portion 104 that determines the characteristics of the semantic information when the user is close to the light emitting portion 104 than when the ambient light level or ambient light contribution is high or normal. In some embodiments, where the ambient light level sensor is a camera or image sensor, the control unit 106 can determine the ambient light level or ambient light contribution from a comparison of images in which the user is illuminated with light from the apparatus 100 (including the light conveying the semantic information) and images in which the user is not illuminated (or not evenly illuminated) with light from the apparatus 100. In particular the control unit 106 can 'subtract' the images in which the user is not illuminated from images in which the user is illuminated to determine the ambient light level or ambient light contribution.

In some embodiments, the control of the light emitting portion 104 can be based on the measured position of the user relative to the light emitting portion 104 and on an analysis or observation of the light conveying the semantic information on the user. In these embodiments, the apparatus 100 can comprise a camera or other image sensor (which can be the same as the camera or image sensor described in the above embodiments) that obtains one or more images or a video sequence of the user as the semantic information is conveyed to the user using the light emitting portion 104, and the control unit 106 analyses the obtained images or video sequence to determine the effect of the light conveying the semantic information on the user and/or to determine the evenness of lighting on the user (e.g. determine whether or which parts of the user are more shadowed than others). The control unit 106 can then determine an adjustment to the light emitting portion 104 to minimise the effect of the light conveying the semantic information on the user. For example, if the semantic information is being conveyed using red light, the control unit 106 can analyse the images or video sequence to determine if the red light is casting onto the user, and if so, the control unit 106 can control the light emitting portion 104 to reduce the brightness, intensity or colour saturation, or change the colour or colour blend to minimise the light casting on the user. It will be appreciated that in these embodiments the control unit 106 can firstly effect an adjustment or control of the light emitting portion 104 based on the measured position of the user relative to the light emitting portion 104 and then analyse images or a video sequence of the user to determine if further adjustment or control is necessary. Alternatively, it will be appreciated that in these embodiments the control unit 106 can control the light emitting portion 104 to present the semantic information to the user and effect a single adjustment or control of the light emitting portion 104 based on the measured position of the user relative to the light emitting portion 104 and an analysis of images or a video sequence of the user.

Thus, there is provided an improved apparatus and method of operating an apparatus that minimises the effect of light conveying semantic information on a presented image of a user.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A method of operating an apparatus to convey semantic information to a user of the apparatus, the apparatus comprising a display surface configured to display a real-time image of the user, the method comprising:
   measuring a position of the user relative to a light emitting portion;
   determining semantic information, regarding at least one of a timing and a quality of a performed personal care activity by monitoring the performance of the personal care activity by the user; and
   controlling the light emitting portion to emit light to convey to the user the determined at least one of the timing and the quality of the monitored personal care activity, wherein controlling the light emitting portion comprises controlling the light emitting portion to minimize a shadowing and/or color-casting effect of the light conveying the semantic information on the user and a real-time image of the user presented on the display surface based on the measured position of the user relative to the light emitting portion.

2. The method as claimed in claim 1, wherein the controlling comprises controlling the light emitting portion by adjusting a brightness or intensity of the light used to convey the semantic information based on the measured position of the user relative to the light emitting portion, and presenting the semantic information as an updated indication of at least one of the timing and the quality of the personal care activity as the personal care activity of the user progresses.

3. The method as claimed in claim 1, wherein the light emitting portion comprises a plurality of light emitting diodes and the controlling comprises determining the quality of the personal care activity and controlling the light emitting portion to convey the determined quality as lit proportionate numbers of the plurality of light emitting diodes as the personal care activity of the user progresses.

4. The method as claimed in claim 1, wherein the light emitting portion comprises a plurality of light emitting elements that convey the semantic information, and wherein the controlling comprises determining the timing of the personal care activity and controlling the plurality of light emitting elements to convey the determined timing as lit proportionate numbers of the plurality of light emitting diodes as the personal care activity of the user progresses.

5. The method as claimed in claim 1, wherein the light emitting portion comprises an adjustable optical arrangement and a plurality of light emitting elements that convey the semantic information, and the controlling comprises controlling the adjustable optical arrangement to change a light emission angle or focus of the light emitted by the light emitting elements based on the measured position of the user relative to the light emitting portion.

6. The method as claimed in claim 1, wherein the method further comprises:
   obtaining one or more images or a video sequence of the monitored personal care activity of the user of the apparatus;
   analyzing the obtained one or more images or video sequence to determine a shadowing and/or color-casting effect of light conveying the semantic information on the user and/or to determine an evenness of lighting on the user; and
   wherein the controlling comprises controlling the light emitting portion to minimize the shadowing and/or color-casting effect of the light conveying the semantic information provided by the light emitting portion on the user and the presented real-time image of the user based on the measured position of the user relative to the light emitting portion and the determined effect of the light and/or determined evenness of the lighting.

7. The method as claimed in claim 1, wherein the method further comprises:
   detecting an ambient light level or contribution of ambient light; and
   wherein the controlling comprises controlling the light emitting portion to minimize the shadowing and/or color-casting effect of the semantic information provided by the light emitting portion on the user and the presented real-time image of the user based on the detected ambient light and the measured position of the user relative to the light emitting portion or the detected contribution of ambient light and the measured position of the user relative to the light emitting portion.

8. A tangible computer-readable storage media that is not a transitory propagating signal or wave, comprising control instructions for a method of operating an apparatus to convey semantic information to a user of the apparatus, the apparatus comprising a display surface configured to display a real-time image of the user, the method comprising:
   determining a position of the user relative to a light emitting portion;
   determining semantic information, regarding at least one of a timing and a quality of a performed personal care activity by monitoring the performance of the personal care activity by the user; and
   controlling the light emitting portion to emit light to convey to the user the determined at least one of the timing and the quality of the monitored personal care activity, wherein controlling the light emitting portion comprises controlling the light emitting portion to minimize a shadowing and/or color-casting effect of the light conveying the semantic information on the user and a real-time image of the user presented on the display surface based on the determined position of the user relative to the light emitting portion.

9. The tangible computer-readable storage media as claimed in claim 8, wherein the controlling comprises controlling the light emitting portion by adjusting a brightness or intensity of the light used to convey the semantic information based on the measured position of the user relative to the light emitting portion, and presenting the semantic information as an updated indication of at least one of the timing and the quality of the personal care activity as the personal care activity of the user progresses.

10. The tangible computer-readable storage media as claimed in claim 8, wherein the light emitting portion comprises a plurality of light emitting diodes and the controlling comprises determining the quality of the personal care activity and controlling the light emitting portion to convey the determined quality as lit proportionate numbers of the plurality of light emitting diodes as the personal care activity of the user progresses.

11. The tangible computer-readable storage media as claimed in claim 8, wherein the light emitting portion comprises a plurality of light emitting elements that convey the semantic information, and wherein the controlling comprises determining the timing of the personal care activity and controlling the plurality of light emitting elements to convey the determined timing as lit proportionate numbers of the plurality of light emitting diodes as the personal care activity of the user progresses.

12. The tangible computer-readable storage media as claimed in claim 8, wherein the method further comprises:
- obtaining one or more images or a video sequence of the monitored personal care activity of the user of the apparatus;
- analyzing the obtained one or more images or video sequence to determine a shadowing and/or color-casting effect of light conveying the semantic information on the user and/or to determine an evenness of lighting on the user; and
- wherein the controlling comprises controlling the light emitting portion to minimize the shadowing and/or color-casting effect of the light conveying the semantic information provided by the light emitting portion on the user and the presented real-time image of the user based on the measured position of the user relative to the light emitting portion and the determined effect of the light and/or determined evenness of the lighting.

\* \* \* \* \*